United States Patent
Persson et al.

(10) Patent No.: US 12,543,056 B2
(45) Date of Patent: Feb. 3, 2026

(54) OTA ESTIMATION OF AN RF PARAMETER OF A RADIO TRANSMITTER

(71) Applicant: Telefonaktiebolaget LM Ericsson (publ), Stockholm (SE)

(72) Inventors: Lars Persson, Åsa (SE); Christer Engdahl, Särö (SE); Torbjörn Elfström, Fjärås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 807 days.

(21) Appl. No.: 17/638,447

(22) PCT Filed: Aug. 28, 2019

(86) PCT No.: PCT/EP2019/072945
§ 371 (c)(1),
(2) Date: Feb. 25, 2022

(87) PCT Pub. No.: WO2021/037354
PCT Pub. Date: Mar. 4, 2021

(65) Prior Publication Data
US 2022/0330058 A1 Oct. 13, 2022

(51) Int. Cl.
H04W 24/08 (2009.01)
H04B 17/318 (2015.01)
(52) U.S. Cl.
CPC .......... *H04W 24/08* (2013.01); *H04B 17/318* (2015.01)
(58) Field of Classification Search
None
See application file for complete search history.

(56) References Cited

U.S. PATENT DOCUMENTS

2005/0192029 A1* 9/2005 Aigner ................. H04W 64/00
455/456.1
2008/0311944 A1* 12/2008 Hansen ..................... G01S 1/44
455/517

(Continued)

OTHER PUBLICATIONS

3GPP, "3GPP TS 37.105 V15.6.0", 3rd Generation Partnership Project; Technical Specification Group Radio Access Network; Active Antenna System (AAS) Base Station (BS) transmission and reception (Release 15), Jun. 2019, 1-240.

(Continued)

*Primary Examiner* — Srinivasa R Reddivalam
(74) *Attorney, Agent, or Firm* — Sage Patent Group

(57) ABSTRACT

There is provided mechanisms for OTA estimation of an RF parameter of a radio transmitter. A method is performed by a measurement equipment. The method comprises obtaining information of spatial radiation pattern used by the radio transmitter and power allocation used by the radio transmitter for transmission of a signal using the spatial radiation pattern. The method comprises obtaining a measurement of at least one of signal power and signal frequency of the signal as transmitted from the radio transmitter by measuring on the signal. The measurement is made with respect to spatial orientations and distance between the radio transmitter and the measurement equipment. The method comprises estimating the RF parameter for the signal transmitted by the radio transmitter from the measurement and using the information of spatial radiation pattern, power allocation, and spatial orientations and distance.

19 Claims, 9 Drawing Sheets

(56) References Cited

U.S. PATENT DOCUMENTS

2015/0133173 A1* 5/2015 Edge .................... G01S 5/08
455/456.6
2017/0367053 A1* 12/2017 Noh .................... H04W 52/367

OTHER PUBLICATIONS

3GPP, "3GPP TS 38.104 V15.6.0", 3rd Generation Partnership Project; Technical Specification Group Radio Access Network; NR; Base Station (BS) radio transmission and reception (Release 15), Jun. 2019, 1-226.
Ericsson, "TP to TS 38.141-2 on MU and TT for transmission in-band TRP emission and directional requirements or FR2 and FR1", 3GPP TSG-RAN WG4 #88, R4-1811751, Gothenburg, Sweden, Aug. 20-24, 2018, 1-35.

* cited by examiner

OTA ESTIMATION OF AN RF PARAMETER OF A RADIO TRANSMITTER

TECHNICAL FIELD

Embodiments presented herein relate to methods, a measurement equipment, a radio transmitter, computer programs, and a computer program product for over-the-air (OTA) estimation of a radio frequency (RF) parameter of the radio transmitter.

BACKGROUND

When any radio equipment is to be deployed, regulatory RF electromagnetic field (EMF) exposure requirements should be accounted for. These RF EMF exposure regulations may typically be based on the guidelines from the International Commission on Non-Ionizing Radiation Protection (ICNIRP) but may take different forms in some countries and regions. The aim of RF EMF exposure regulations is to ensure that human exposure to RF energy is kept within prescribed limits, which typically have been set with wide safety margins.

Some newly developed base stations and other radio equipment are equipped with so-called active antenna systems (AAS). These antenna systems increase the capacity and/or coverage compared to traditionally used antenna system by addition of one or more antenna arrays. In turn, this enables the simultaneous transmission of parallel data streams between a base station on the network side and a terminal device at the user-side by means of so-called multiple-input-multiple-output (MIMO) transmission.

For base stations and other radio equipment having AAS systems with a large number of antenna elements in order to achieve a high directivity, there may be a large maximum beamforming gain. The term directivity generally refers to a measure of how 'directional' the radiation pattern of an antenna is. A consequence of a large beamforming gain is typically that the radiated power is concentrated in directional beams (i.e., having high directivity), meaning that the Equivalent Isotropic Radiated Power (EIRP) rating of the base station, i.e. the equivalent power radiated from an antenna with unity antenna gain in all directions, is increased as compared to the situation without AAS systems. EIRP as a parameter is defined by IEEE in IEEE Standard for Definitions of Terms for Antennas (IEEE Std 145-2013).

Traditionally, deployed base stations are periodically monitored in field during operating. One reason is to check on basic RF performance, such as output power, frequency error and radio emissions. One reason is to secure coexistence within the network and with other services. The monitoring might be conducted through measuring RF parameters, either at the RF connector at the transceiver, or OTA as EIRP measurements. For EIRP measurements, assumptions regarding the antenna gain is required.

In specifications 3GPP TS 37.105 entitled "Active Antenna System (AAS) Base Station (BS) transmission and reception", Release 15, and 3GPP TS 38.104 entitled "NR; Base Station (BS) radio transmission and reception", Release 15, have been specified OTA requirements. One goal of these specifications is to allow for a base station having an integrated AAS without access to traditional RF connectors to be compliant for deployment. To capture the dynamic behavior of an AAS, requirements, such as output power, have been defined based on total radiated power as a metric.

In some countries regulators periodically monitor basic RF parameters (e.g. in-band total radiated power and frequency error). Up until now regulatory measurements to determine basic RF parameters on legacy systems, e.g. a non-AAS base station, have been carried out by measuring output power by connecting a measurement instrument via a cable to a RF connector at the so-called Antenna Reference Point (ARP), sometimes denoted a transceiver array boundary (TAB) connector. In most base stations equipped with an AAS such connectors at the ARP are not available.

Hence, there is still a need for improved ways to verify that base stations and other radio equipment are compliant in terms of total radiated power, etc.

SUMMARY

An object of embodiments herein is to provide efficient OTA estimation of an RF parameter of a radio transmitter.

According to a first aspect there is presented a method for OTA estimation of an RF parameter of a radio transmitter. The method is performed by a measurement equipment. The method comprises obtaining information of spatial radiation pattern used by the radio transmitter and power allocation used by the radio transmitter for transmission of a signal using the spatial radiation pattern. The method comprises obtaining a measurement of at least one of signal power and signal frequency of the signal as transmitted from the radio transmitter by measuring on the signal. The measurement is made with respect to spatial orientations and distance between the radio transmitter and the measurement equipment. The method comprises estimating the RF parameter for the signal transmitted by the radio transmitter from the measurement and using the information of spatial radiation pattern, power allocation, and spatial orientations and distance.

According to a second aspect there is presented a measurement equipment for OTA estimation of an RF parameter of a radio transmitter. The measurement equipment comprises processing circuitry. The processing circuitry is configured to cause the measurement equipment to obtain information of spatial radiation pattern used by the radio transmitter and power allocation used by the radio transmitter for transmission of a signal using the spatial radiation pattern. The processing circuitry is configured to cause the measurement equipment to obtain a measurement of at least one of signal power and signal frequency of the signal as transmitted from the radio transmitter by measuring on the signal. The measurement is made with respect to spatial orientations and distance between the radio transmitter and the measurement equipment. The processing circuitry is configured to cause the measurement equipment to estimate the RF parameter for the signal transmitted by the radio transmitter from the measurement and using the information of spatial radiation pattern, power allocation, and spatial orientations and distance.

According to a third aspect there is presented a measurement equipment for OTA estimation of an RF parameter of a radio transmitter. The measurement equipment comprises an obtain module configured to obtain information of spatial radiation pattern used by the radio transmitter and power allocation used by the radio transmitter for transmission of a signal using the spatial radiation pattern. The measurement equipment comprises an obtain module configured to obtain a measurement of at least one of signal power and signal frequency of the signal as transmitted from the radio transmitter by measuring on the signal. The measurement is made with respect to spatial orientations and distance between the radio transmitter and the measurement equipment. The measurement equipment comprises an estimate module configured to estimate the RF parameter for the signal transmitted by the radio transmitter from the measurement and using the information of spatial radiation pattern, power allocation, and spatial orientations and distance.

According to a fourth aspect there is presented a computer program for OTA estimation of an RF parameter of a radio transmitter. The computer program comprises computer program code which, when run on processing circuitry of a measurement equipment, causes the measurement equipment to perform a method according to the first aspect.

According to a fifth aspect there is presented a method for OTA estimation of an RF parameter of a radio transmitter. The method is performed by the radio transmitter. The method comprises providing information of spatial radiation pattern used by the radio transmitter and power allocation used by the radio transmitter for transmission of a signal. The method comprises transmitting the signal according to the spatial radiation pattern and using the power allocation for enabling OTA estimation of the RF parameter of the radio transmitter.

According to a sixth aspect there is presented a radio transmitter for OTA estimation of an RF parameter of the radio transmitter. The radio transmitter comprises processing circuitry. The processing circuitry is configured to cause the radio transmitter to provide information of spatial radiation pattern used by the radio transmitter and power allocation used by the radio transmitter for transmission of a signal. The processing circuitry is configured to cause the radio transmitter to transmit the signal according to the spatial radiation pattern and using the power allocation for enabling OTA estimation of the RF parameter of the radio transmitter.

According to a seventh aspect there is presented a radio transmitter for OTA estimation of an RF parameter of the radio transmitter. The radio transmitter comprises a provide module configured to provide information of spatial radiation pattern used by the radio transmitter and power allocation used by the radio transmitter for transmission of a signal. The radio transmitter comprises a provide module configured to transmit the signal according to the spatial radiation pattern and using the power allocation for enabling OTA estimation of the RF parameter of the radio transmitter.

According to an eight aspect there is presented a computer program for OTA estimation of an RF parameter of a radio transmitter, the computer program comprising computer program code which, when run on processing circuitry of the radio transmitter, causes the radio transmitter to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously, these methods, this measurement equipment, this radio transmitter, and these computer programs provide efficient OTA estimation of an RF parameter of a radio transmitter.

Advantageously, these methods, this measurement equipment, this radio transmitter, and these computer programs enable the total radiated power of the radio transmitter to be measured.

Advantageously, these methods, this measurement equipment, this radio transmitter, and these computer programs enable total radiated power measurement to be efficiently obtained without need of RF connectors.

Advantageously, even for a radio transmitter with accessible RF connectors, these methods, this measurement equipment, this radio transmitter, and these computer programs offer more convenient and efficient test mechanisms.

Advantageously, these methods, this measurement equipment, this radio transmitter, and these computer programs enable malfunctions, such as wrong beam characteristics and output power level, of the radio transmitter to be efficiently discovered. Such malfunctions can be caused by faulty radio equipment, erroneous beam-weights applied or not properly working calibration.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
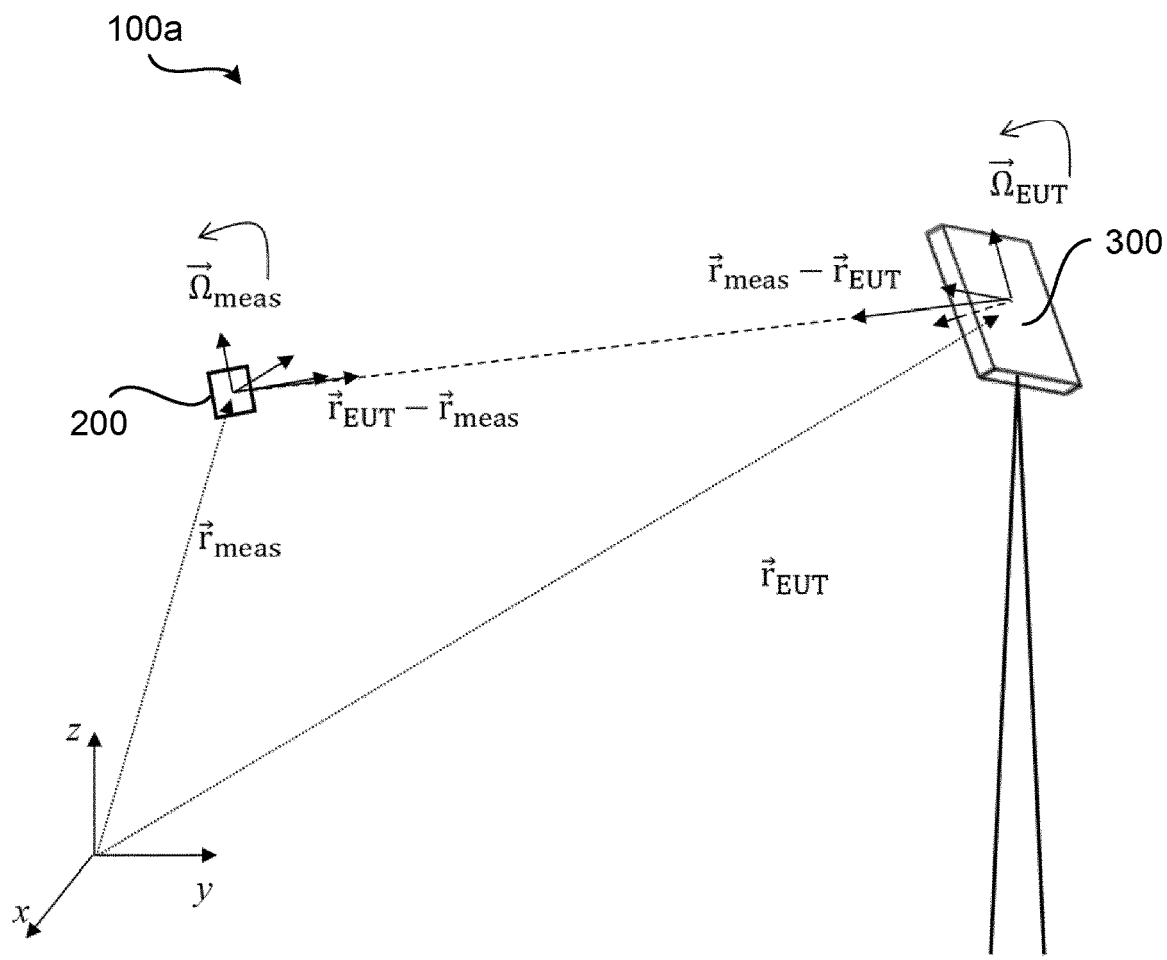
FIG. 1 is a schematic diagram illustrating a communication network according to embodiments.

FIG. 1 is a schematic diagram illustrating a communication network 100a where embodiments presented herein can be applied. The communication network 100a comprises a radio transmitter 300 and a measurement equipment 200 and also schematically illustrates how the radio transmitter 300 and the measurement equipment 200 are oriented in relation to each other, as will be further disclosed below.

In some examples the radio transmitter 300 is an AAS. Further, in some examples the radio transmitter 300 is part of a radio access network node. The radio access network node could be any of a radio base station, base transceiver station, node B (NB), evolved node B (eNB), gNB, access point, or access node.

In some examples the measurement equipment 200 is a terminal device. The terminal device could be any of a portable wireless device, mobile station, mobile phone, handset, wireless local loop phone, user equipment (UE), smartphone, laptop computer, tablet computer, wireless modem, network equipped vehicle, such as an unmanned aerial vehicle, or wireless sensor device.

As noted above there is still a need for improved ways to verify that base stations and other radio equipment, such as the radio transmitter 300, are compliant in terms of total radiated power, etc.

In this respect, one option to measure the total radiated power is for the measurement equipment 200 to measure received power levels at many positions within the coverage area of the radio transmitter 300, thereby enabling the full sphere pattern of the radio transmitter 300 to be derived. Such a procedure might be efficiently carried out in a shielded antenna test range but is most likely prohibitively difficult out in field where the radio transmitter 300 is to be deployed, or even has been deployed.

The embodiments disclosed herein therefore relate to mechanisms for OTA estimation of an RF parameter of a radio transmitter 300. In order to obtain such mechanisms there is provided a measurement equipment 200, a method performed by the measurement equipment 200, a computer program product comprising code, for example in the form of a computer program, that when run on processing circuitry of the measurement equipment 200, causes the measurement equipment 200 to perform the method. In order to obtain such mechanisms there is further provided a radio transmitter 300, a method performed by the radio transmitter 300, and a computer program product comprising code, for example in the form of a computer program, that when run on processing circuitry of the radio transmitter 300, causes the radio transmitter 300 to perform the method.

At least some of the herein disclosed embodiments are based on that some static beams, as defined by the spatial radiation pattern used by the radio transmitter 300, can be thoroughly specified and verified. Information about this, such as of the spatial radiation pattern and output power can be stored in the radio transmitter 300 and be made available to other entities, such as the measurement equipment 200 as needed. By the measurement equipment 200 being configured to measure on signals transmitted from the radio transmitter 300 in one or several directions and to use the information of the spatial radiation pattern and output power, the total radiated power can be determined quickly and conveniently.

The measurement equipment 200, equipped with functionality for measuring position, orientations and received power, as well as sending and receiving information, might be used out in the field to measure on signal transmitted from the radio transmitter 300, as representing an Equipment Under Test (EUT), that can form a transmitting beam with a known spatial radiation pattern and output power, for example a thoroughly specified static broadcasting beam covering a wide service area. Measurements may be performed on ground (for example when the measurement equipment 200 is implemented in, or collocated with, a mobile phone) or in space (for example when the measurement equipment 200 is implemented in, or collocated with, an unmanned aerial vehicle).

Figure 2:
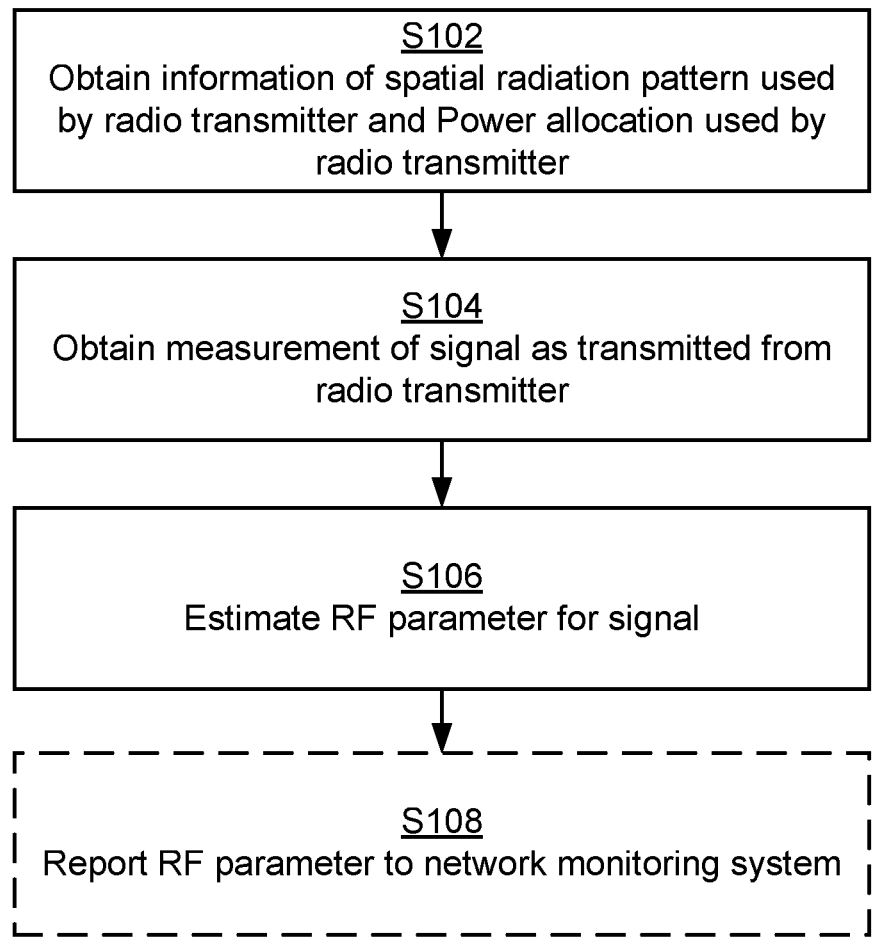
FIGS. 2, 3 and 8 are flowcharts of methods according to embodiments.

Reference is now made to FIG. 2 illustrating a method for OTA estimation of an RF parameter of a radio transmitter 300 as performed by the measurement equipment 200 according to an embodiment.

S102: The measurement equipment 200 obtains information of spatial radiation pattern used by the radio transmitter 300 and power allocation used by the radio transmitter 300 for transmission of a signal using the spatial radiation pattern. The signal might either be a reference signal, another already existing signal, or a dedicated test signal.

S104: The measurement equipment 200 obtains a measurement of at least one of signal power and signal frequency of the signal as transmitted from the radio transmitter 300 by measuring on the signal. The measurement is made with respect to spatial orientations and distance between the radio transmitter 300 and the measurement equipment 200.

S106: The measurement equipment 200 estimates the RF parameter for the signal transmitted by the radio transmitter 300 from the measurement and using the information of spatial radiation pattern, power allocation, and spatial orientations and distance.

Embodiments relating to further details of OTA estimation of an RF parameter of a radio transmitter 300 as performed by the measurement equipment 200 will now be disclosed.

There could be different types of RF parameters that are estimated in S106. According to a first embodiment, the RF parameter pertains to total radiated power as used by the radio transmitter 300 when transmitting the signal. Further, carrier frequency of the radio transmitter 300 can be measured by the measurement equipment 200, and from that, frequency error can be calculated. According to a second embodiment, the RF parameter thus pertains to carrier frequency error of the signal, such as in-band to carrier frequency error of the signal. Thereby, the need for frequency error to be separately measured can be eliminated. In this respect, when the measurement of the signal relates to frequency information of the signal, the in-band carrier frequency error might be estimated by comparing the carrier frequency used by the radio transmitter 300 to the frequency information of the signal (defining the correct frequency of the signal).

In some aspects, the estimated RF parameter is by the measurement equipment 200 reported to another entity, such as the radio transmitter 300 or a network monitoring system. Particularly, according to an embodiment, the measurement equipment 200 is configured to perform (optional) step S108:

S108: The measurement equipment 200 reports the RF parameter to a network node 400 of a network monitoring system.

Figure 6:
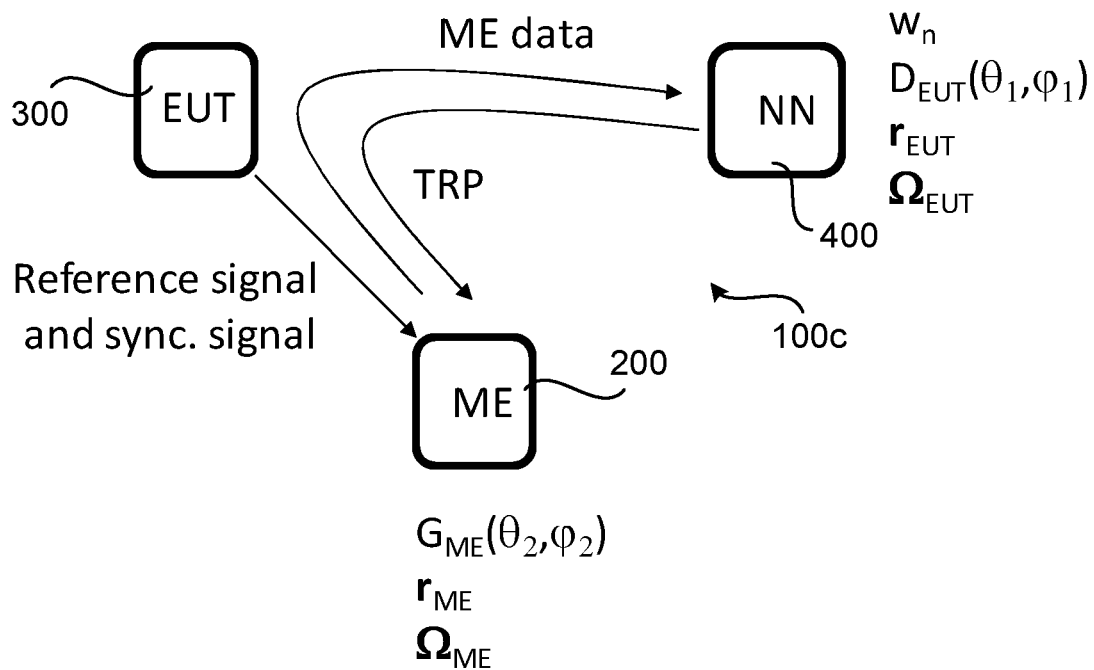

Such an embodiment is illustrated in FIG. 6 and will be further disclosed below.

There may be different ways to define the spatial orientations and distance. In some aspects the spatial orientations and distance are given as a function of the respective locations and orientations of the radio transmitter 300 and the measurement equipment 200. Particularly, according to an embodiment, the spatial orientations and distance are defined by location of the radio transmitter 300, orientation of the radio transmitter 300 relative the measurement equipment 200, location of the measurement equipment 200, and orientation of the measurement equipment 200 relative the radio transmitter 300. In some embodiments, information of the location of the radio transmitter 300, orientation of the radio transmitter 300 relative the measurement equipment 200, location of the measurement equipment 200, and orientation of the measurement equipment 200 relative the radio transmitter 300 is available to the measurement equipment 200.

Exploiting the fact that the radio transmitter 300 can form a transmitting beam with a certain spatial radiation pattern, knowledge of the position and orientation of the radio transmitter 300, and position and orientation of the measurement equipment 200, RF parameters, such as the total radiated power and frequency error, of the radio transmitter 300 can be calculated by the measurement equipment 200 measuring the incoming signal power and transforming the measured signal power to total radiated power by using the known test beam spatial characteristics as given by the spatial radiation pattern and the known spatial characteristics (such as spatial radiation pattern) of the beam used by the measurement equipment 200 to receive the signal.

There could be different ways for the measurement equipment 200 to obtain the measurement in S104. For example, the measurement equipment 200 has its own spatial radiation pattern, which could be omnidirectional, have a specific beam pointing direction, etc., depending on the antenna structure, etc., of the measurement equipment 200. The signal as measured by the measurement equipment 200 might then be received with different gain levels depending on the spatial radiation pattern of the measurement equipment 200. Particularly, according to an embodiment, the measurement is obtained by the measurement equipment 200 performing measurements according the spatial radiation pattern of the measurement equipment 200. The RF parameter for the signal transmitted by the radio transmitter 300 might then be estimated based on the spatial radiation pattern of the measurement equipment 200.

There could be different ways for the measurement equipment 200 to obtain information about what parameter values, such as spatial radiation pattern, etc., that is used by the radio transmitter 300 when the signal is transmitted. In some aspects the information of the spatial radiation pattern and power allocation used by the radio transmitter 300 is obtained either from a network node 400 or from the radio transmitter 300 itself. The former case will be further disclosed below with reference to FIGS. 6 and 7 whereas the latter case will be further disclosed below with reference to FIGS. 4 and 5.

In order to calculate in-band wanted carrier total radiated power, one measurement on the signal for one position and one orientation is sufficient. However, by obtaining measurements on the signal for several positions and/or orientations the expected radiation pattern of a specific test beam pattern can be verified, and furthermore, the in-band total radiated power measurement accuracy can be improved. The measurement uncertainty of the RF parameter might thus be improved by measurements being made at different locations. In some aspects the measurement equipment 200 therefore obtains more than one measurement of the signal. Particularly, according to an embodiment, at least two measurements of the signal are obtained and used when estimating the RF parameter. This enables the measurement equipment 200 to make measurements at different locations and/or with different orientation. Hence, each measurement could be made with respect to respective spatial orientations and distance between the radio transmitter 300 and the measurement equipment 200. To increase the measurement accuracy, and as a basic verification of spatial characteristics of the radio transmitter 300, the test procedure can thus be repeated for multiple positions of the measurement equipment 200. An improved estimate of the total radiated power can then be calculated based on the measured values, for example as an average. Comparison of the results of the at least two measurements could by the measurement equipment 200 be used to increase the accuracy of the estimation of the value of the RF parameter. Comparison of the results of the at least two measurements could by the measurement equipment 200 be used to verify the shape of the spatial radiation pattern of the radio transmitter 300.

There could be different types of measurements obtained by the measurement equipment 200 in S104.

Traditionally, the distance between the radio transmitter 300 and the measurement equipment is long enough to guarantee far-field conditions. According to a first embodiment, the measurement is made in far-field and defines a far-field measurement. According to a second embodiment, the measurement is made in near-field and defines a near-field measurement.

Further aspects of when the measurements are made in near-field will now be disclosed.

In the case of near-field conditions the measurement equipment 200 might be configured to measure phase and amplitude. Hence, in some examples the near-field measurement is given in terms of both phase and amplitude at a given surface in front of the radio transmitter 300.

In the case of near-field conditions more than one measurement is generally needed. In particular, in some examples a plurality of near-field measurements of the signal as transmitted from the radio transmitter 300 are obtained. Each near-field measurement is then made at respective spatial orientations and distance between the radio transmitter 300 and the measurement equipment 200.

In the case of near-field conditions the measurement equipment 200 might be configured to perform a near-field to far-field transformation. Hence, in some examples a near-field to far-field transformation is applied on the plurality of measurements to translate the near-field measurements to far-field measurements. In some examples, an integration is made over the at least two measurements to translate the translate the near-field measurements to far-field measurements. For a near-field measurement a sampling grid (for example rectangular or spherical) should be selected. The resolution of the sampling grid is determined by the frequency and size of the antenna aperture.

Figure 3:
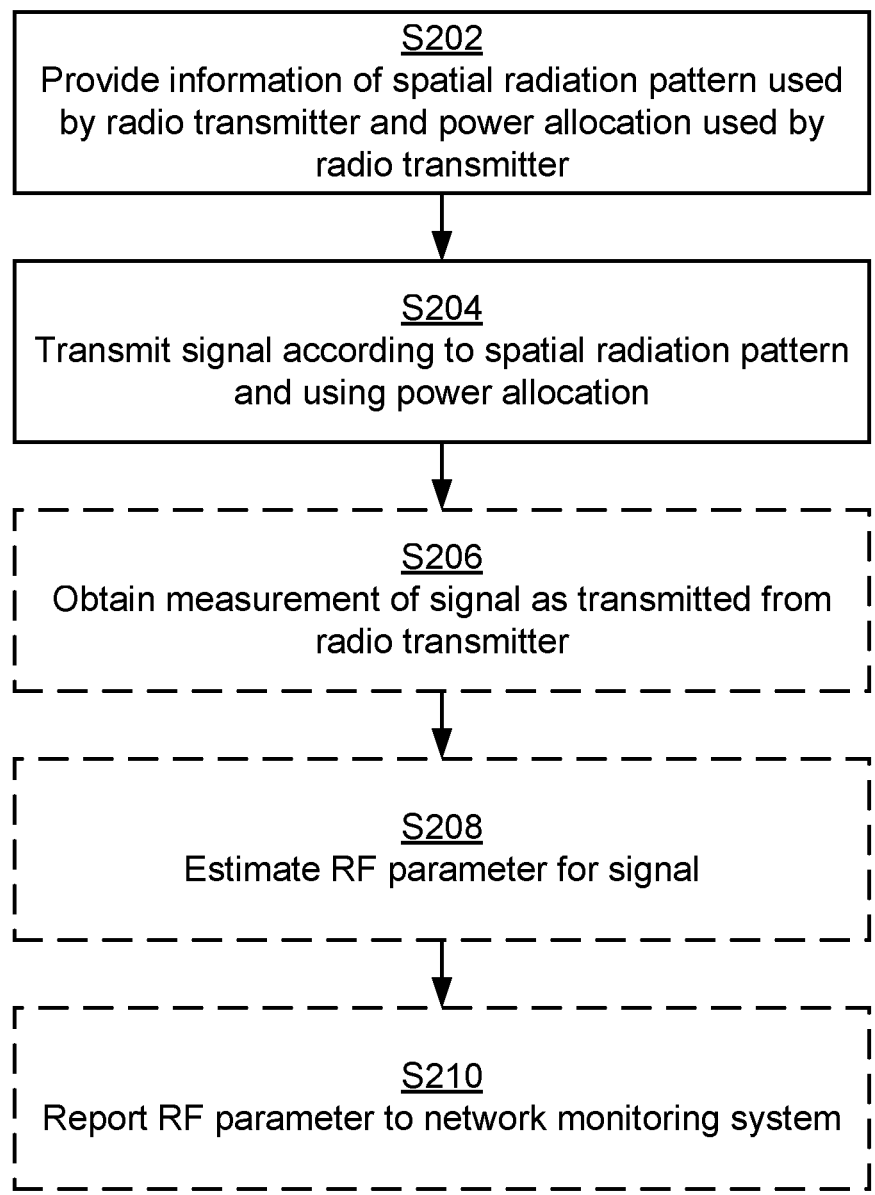

Reference is now made to FIG. 3 illustrating a method for OTA estimation of an RF parameter of a radio transmitter 300 as performed by the radio transmitter 300 according to an embodiment.

S202: The radio transmitter 300 provides information of spatial radiation pattern used by the radio transmitter 300 and power allocation used by the radio transmitter 300 for transmission of a signal.

S204: The radio transmitter 300 transmits the signal according to the spatial radiation pattern and using the power allocation for enabling OTA estimation of the RF parameter of the radio transmitter 300.

Embodiments relating to further details of OTA estimation of an RF parameter of a radio transmitter 300 as performed by the radio transmitter 300 will now be disclosed.

There might be different entities to which the information is provided in S202. In some embodiments the information is provided either to a network node 400 or to a measurement equipment 200. In other embodiments the information is provided to both the network node 400 and the measurement equipment 200.

There might be further pieces of information provided by the radio transmitter 300 in S202. In some examples, information of location of the radio transmitter 300 and of orientation of the radio transmitter 300 also is provided in S202.

In some aspects the radio transmitter 300 obtains a measurement of the signal from the measurement equipment and itself estimates the RF parameter. Particularly, according to an embodiment, the radio transmitter 300 is configured to perform (optional) steps S206 and S208:

S206: The radio transmitter 300 obtains a measurement of the signal from a measurement equipment 200. The measurement has been made with respect to spatial orientations and distance between the radio transmitter 300 and the measurement equipment 200.

S208: The radio transmitter 300 estimates the RF parameter for the signal from the measurement and using the information of spatial radiation pattern, power allocation, and the spatial orientations and distance.

As above, in some embodiments, the spatial orientations and distance are defined by location of the radio transmitter 300, orientation of the radio transmitter 300 relative the measurement equipment 200, location of the measurement equipment 200, and orientation of the measurement equipment 200 relative the radio transmitter 300.

In some aspects, the estimated RF parameter is by the radio transmitter 300 reported to another entity, such as the measurement equipment 200 or a network monitoring system. Particularly, according to an embodiment, the radio transmitter 300 is configured to perform (optional) step S210:

S210: The radio transmitter 300 reports the RF parameter to a network node 400 of a network monitoring system.

Such an embodiment is illustrated in FIG. 6 and will be further disclosed below.

Further aspects of OTA estimation of an RF parameter of a radio transmitter 300 applicable to both the measurement equipment 200 and the radio transmitter 300 will now be disclosed with reference again being made to FIG. 1.

The radio transmitter 300, located at a position $\vec{r}_{EUT}$, is assumed to send a test signal in a beam (that may be identical to one of the beams used during regular operation). This test signal is measured on by the measurement equipment 200 located at a position $\vec{r}_{meas}$.

The measurement equipment 200 might measure the received power at one or more locations. In one embodiment the total radiated power for the reference signal is estimated based on the relative distance between the (antenna of the) radio transmitter 300 and the (antenna of the) measurement equipment 200, the antenna gain of the measurement equipment 200, and the directivity of the radio transmitter 300 (e.g. as given by the orientation of the radio transmitter 300 and the orientation of the measurement equipment 200).

Based on the measured power at the measurement receiver the test signal, the total radiated power, $TRP_{ref}$, of the test signal (e.g. cell-specific reference signal (CRS) resource element (RE) power for the Long Term Evolution (LTE) air interface or synchronization signal block (SSB) RE power for the New Radio (NR) air interface) can be calculated as:

$$TRP_{ref} = \frac{P_{meas,received} * (4\pi |\vec{r}_{meas} - \vec{r}_{EUT}|)2}{D_{EUT}(\theta_1, \varphi_1) * G_{meas}(\theta_2, \varphi_2) * \lambda^2}.$$

Here, $D_{EUT}(\theta_1, \varphi_1)$ is the directivity of radio transmitter 300 in the direction $\theta_1, \varphi_1$. This value can be fetched from the directivity pattern of the radio transmitter 300 stored in its memory. The values of $\theta_1$ and $\varphi_1$ are determined by the position and orientations of the radio transmitter 300 and the measurement equipment 200. $P_{meas,received}$ is the power of the test signal as received by the measurement equipment 200. $G_{meas}(\theta_2, \varphi_2)$ is the antenna gain of the measurement equipment 200. The values of $\theta_2$ and $\varphi_2$ are determined by the position and orientations of the radio transmitter 300 and the measurement equipment 200. $(4\pi|\vec{r}_{meas} - \vec{r}_{EUT}|)^2/\lambda^2$ is the free space path loss between the radio transmitter 300 and the measurement equipment 200 assuming isotropic transmit and receive antennas at the radio transmitter 300 and the measurement equipment 200.

In order to calculate the directivity and antenna gain involved in the expression above, the angular position of the measurement equipment 200, as seen from the radio transmitter 300, denoted $(\theta_1, \varphi_1)$, and the angular position of the radio transmitter 300 as seen from the measurement equipment 200, denoted $(\theta_2, \varphi_2)$, are obtained. The position and orientation of the radio transmitter 300 and the measurement equipment 200 in the reference coordinate system are $\vec{r}_{EUT}$, $\vec{\Omega}_{EUT}$ and $\vec{r}_{meas}$, $\vec{\Omega}_{meas}$, respectively. When the values of these quantities are known, any vector can be transformed from the reference coordinate system to antenna related coordinate systems at the radio transmitter 300 and the measurement equipment 200, respectively. These coordinate systems could be oriented in a standard way relative to the antennas, as indicated in FIG. 2. The angular position $(\theta_1, \varphi_1)$ is then obtained as the standard spherical angular coordinates of the vector $\vec{r}_{meas} - \vec{r}_{EUT}$, after transformation from the reference coordinate system to the coordinate system of the radio transmitter 300. Likewise, the angular position $(\theta_2, \varphi_2)$ is obtained as the standard spherical angular coordinates of the vector $\vec{r}_{EUT} - \vec{r}_{meas}$, after transformation from the reference coordinate system to the coordinate system of the measurement equipment 200.

The power expansion for the full carrier bandwidth power for a carrier using orthogonal frequency-division multiplexing (OFDM) can be expressed as:

$$TRP = \frac{TRP_{ref}}{w_{ref}} \sum_{n=1}^{N} w_n,$$

where N is the number of resource elements, $w_n$ is a resource allocation profile with respect to the test signal, $w_{ref}$ is the allocated power to the reference signal, and $TRP_{ref}$ is the absolute power level of the test signal. The resource allocation profile is provided by the base station, and thus the radio transmitter 300, via signaling.

The resource allocation profile might be provided as the resource element power allocation in the frequency domain with respect to the reference resource element power for the test signal. The resource allocation profile might be provided by the base station. For LTE the information is extracted by the number of used NRBs for a certain carrier bandwidth and information from SIB2. For other modulation schemes (such as spread spectrum) the power is just scaled with a scaling factor, where the scaling factor is determined by parameters such as the spreading factor.

For LTE and NR the base station carrier output power level can be calculated from the reference signal power and knowledge about the number of used resource blocks and reference signal offset. As an example, for LTE the carrier power level, defined by TRP, can be calculated as:

$$TRP=TRP_{ref} \cdot NRB \cdot 2(1+5\varphi_B),$$

where $TRP_{ref}$ is the reference signal power level, NRB is the number of resource blocks used for the carrier bandwidth, and $\varphi_B$ is the reference signal power offset, signaled in system information block 2 (SIB2). The measurement equipment 200 might not be able to directly measure the total radiated power since the spatial characteristics for the test signal and the physical downlink shared channel (PDSCH) for a base station equipped with a radio transmitter 300 in the form of an AAS will be different. The spatial behavior of the PDSCH might vary as function of the radio propagation environment.

Memory and interfaces are needed to store and access the following information of the radio transmitter 300 as needed for the measurement of total radiated power. Information of directivity for the test beam spatial pattern is stored in a memory in the radio transmitter 300 or in another memory unit accessible to the measurement equipment 200. Information of position and orientation of the radio transmitter 300 is determined at radio transmitter deployment and stored in a memory in the radio transmitter 300 or in another memory unit accessible to the measurement equipment 200. The sub-carrier power profile can vary in time (e.g. depending on the load in the network) and information thereof is provided by the radio transmitter 300.

Particular embodiments for the measurement equipment 200 to be provided with necessary data to perform OTA estimation of an RF parameter of the radio transmitter 300 based on at least some of the above disclosed embodiments will now be disclosed in detail with reference to FIGS. 4, 5, 6, and 7.

Figure 4:
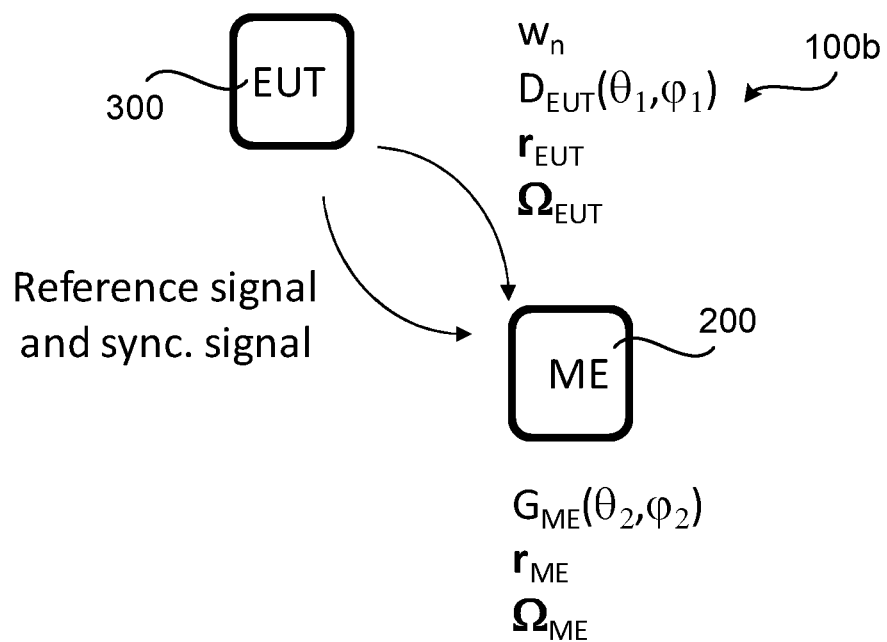
FIGS. 4 and 6 are schematic illustrations of parts of the communication network of FIG. 1 according to embodiments.
Figure 5:
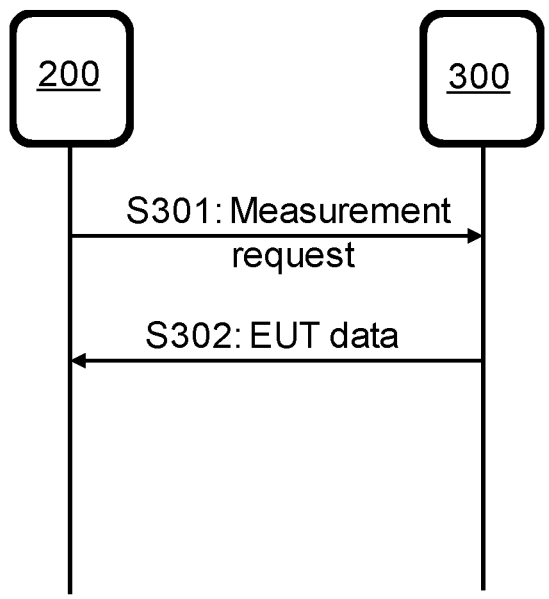
FIGS. 5 and 7 are signalling diagrams according to embodiments.

FIG. 4 schematically illustrates a communication network 100b comprising a radio transmitter 300, representing an EUT, and a measurement equipment 200. FIG. 5 is a signalling diagram for the set-up in FIG. 4.

S301: The measurement equipment 200 sends a measurement request towards the radio transmitter 300.

S302: The radio transmitter 300 responds by sending EUT data identified by the measurement request towards the measurement equipment 200.

The measurement equipment 200 and the radio transmitter 300 might in S301 and S302 communicate with each other over the air using signalling such as radio link control (RLC) signalling and radio resource control (RRC) signalling. Alternatively, the measurement equipment 200 access the radio transmitter 300 via a local management interface, which might be a physical electrical interface such as an Ethernet interface, a universal serial bus (USB) interface, or a serial interface. Using the local management interface, the parameters required by the measurement equipment 200 to estimate the RF parameter, such as total radiated power, are transferred to the measurement equipment 200. After S301 and S302 have been performed, the measurement equipment 200 might obtain one or more OTA measurements on the test signal as sent by the radio transmitter 300 and estimate the RF parameter therefrom as disclosed above.

Figure 7:
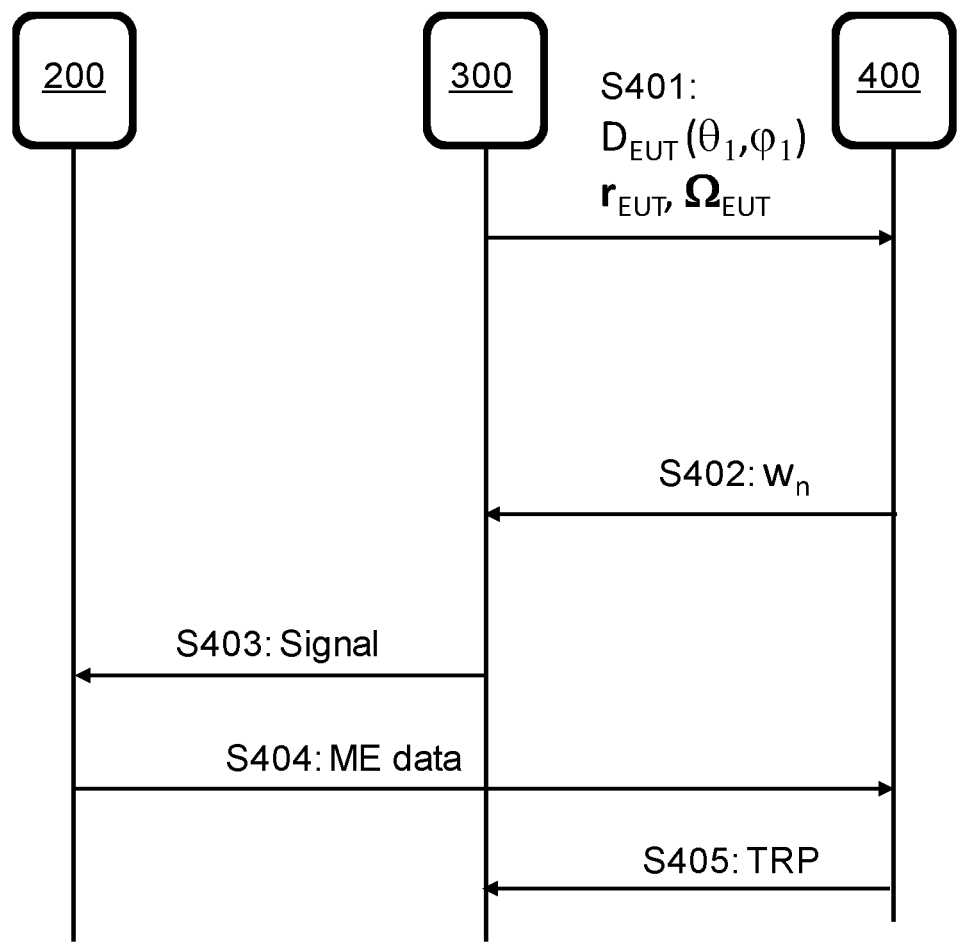

FIG. 6 schematically illustrates a communication network 100c comprising a radio transmitter 300, representing an EUT, a measurement equipment 200, and a network node 400. FIG. 7 is a signalling diagram for the set-up in FIG. 6. When the network node 400 is configured in the communication network, as in FIG. 6, the measurement equipment 200 might request the network node 200 to estimate total radiated power of the radio transmitter 300.

S401: The radio transmitter 300 sends parameter values towards the network node 400. The parameter values pertain to base station deployment information, such as location, orientation, and test signal directivity of the radio transmitter 300.

S402: The network node 400 responds by sending the resource allocation profile towards the radio transmitter 300.

S403: The radio transmitter 300 sends the test signal, which is measured on by the measurement equipment 200.

S404: The measurement equipment 200 sends measurement equipment (ME) data representing the measurement of the test signal, as well as orientation and position information of the measurement equipment 200, towards the network node 400.

S405: The network node 400 estimates the total received power of the radio transmitter 300 using the parameter values previously received from the radio transmitter 300, the resource allocation profile, and the ME data received from the measurement equipment 200. Information of the thus estimated total received power is then signalled towards the radio transmitter 300.

The measurement equipment 200 and the network node 400 might in S404 communicate with each other over the air using signalling such as RLC signalling and RRC signalling.

Figure 8:
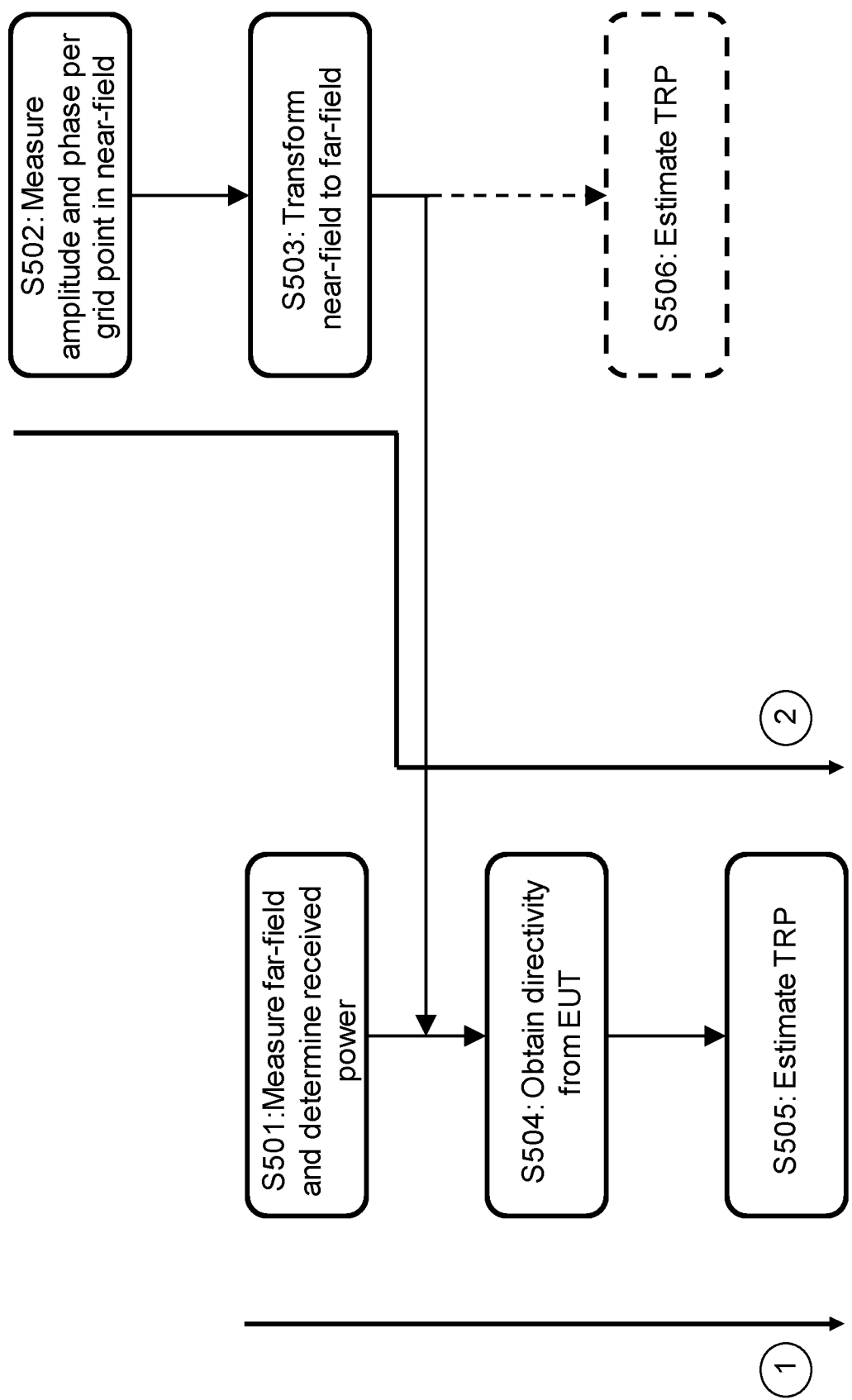

FIG. 8 is a flowchart for OTA estimation of an RF parameter of the radio transmitter 300 illustrating two approaches based on at least some of the above embodiments. Approach 1 is defined by S501, S504, S505 and represents a scenario where one or more measurements are made in the far-field. Approach 2 is defined by S502, S503, S504, S505 (and optionally S506) and represents a scenario where measurements are made in the near-field and where the measurements are transformed to a corresponding far field pattern which is used to give an estimate of far-field characteristics.

S501: The measurement equipment 200 obtains a measurement of received power in the far-field for directivity $D_{EUT}(\theta_1, \varphi_1)$ of the radio transmitter 300 and determines the received power for this directivity. As noted above, measurements may be obtained for different locations, and thus for different coordinates.

S502: The measurement equipment 200 obtains measurements of amplitude and phase per grid point in the near-field using a fine sampling grid on a surface close to the radio transmitter 300.

S503: The measurements of amplitude and phase per grid point are transformed to the $D_{EUT}(\theta_1, \varphi_1)$ in the far-field.

S504: A value of the directivity $D_{EUT}(\theta_1, \varphi_1)$ of the radio transmitter 300 is obtained.

S505: The measurements from either S501 or S502 after transformation in S503 are used together with the directivity of the radio transmitter 300 $D_{EUT}(\theta_1, \varphi_1)$ to estimate the total radiated power (TRP) of the radio transmitter 300.

S506 (optional): The measurements from S502 after transformation in S503 are used directly to estimate the total radiated power of the radio transmitter 300 by integrating the field over the surface.

Figure 9:
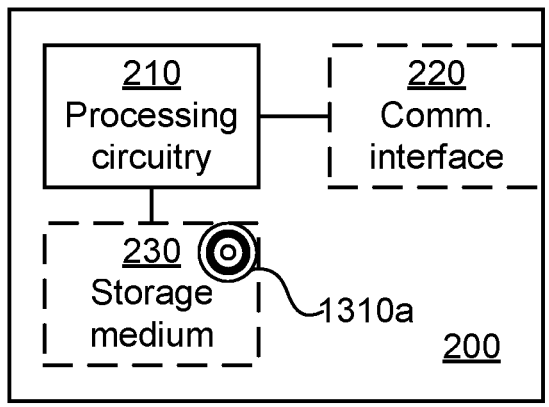
FIG. 9 is a schematic diagram showing functional units of a measurement equipment according to an embodiment.

FIG. 9 schematically illustrates, in terms of a number of functional units, the components of a measurement equipment 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1310*a* (as in FIG. 13), e.g. in the form of a storage medium 230. The processing circuitry 210 may further be provided as at least one application specific integrated circuit (ASIC), or field programmable gate array (FPGA).

Particularly, the processing circuitry 210 is configured to cause the measurement equipment 200 to perform a set of operations, or steps, as disclosed above. For example, the storage medium 230 may store the set of operations, and the processing circuitry 210 may be configured to retrieve the set of operations from the storage medium 230 to cause the measurement equipment 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The measurement equipment 200 may further comprise a communications interface 220 for communications with other entities, such as the radio transmitter 300 and the network node 400.

As such the communications interface 220 may comprise one or more transmitters and receivers, comprising analogue and digital components.

The processing circuitry 210 controls the general operation of the measurement equipment 200 e.g. by sending data and control signals to the communications interface 220 and the storage medium 230, by receiving data and reports from the communications interface 220, and by retrieving data and instructions from the storage medium 230. Other components, as well as the related functionality, of the measurement equipment 200 are omitted in order not to obscure the concepts presented herein.

Figure 10:
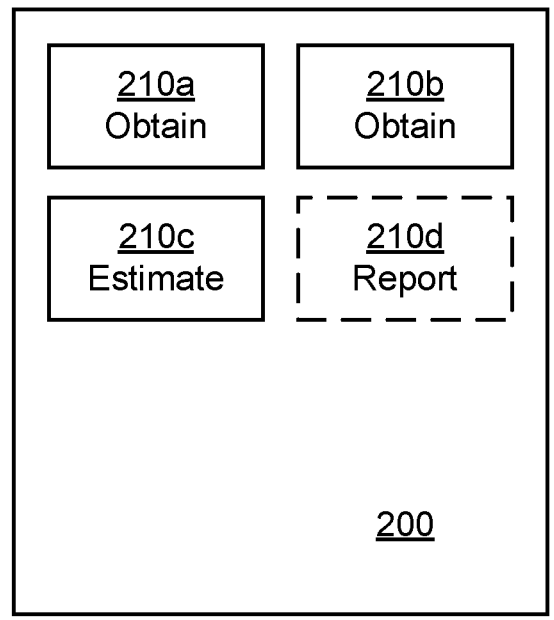
FIG. 10 is a schematic diagram showing functional modules of a measurement equipment according to an embodiment.

FIG. 10 schematically illustrates, in terms of a number of functional modules, the components of a measurement equipment 200 according to an embodiment. The measurement equipment 200 of FIG. 10 comprises a number of functional modules; an obtain module 210*a* configured to perform step S102, an obtain module 210*b* configured to perform step S104, and an estimate module 210*c* configured to perform step S106. The measurement equipment 200 of FIG. 10 may further comprise a number of optional functional modules, such as a report module 210*d* configured to perform step S108. In general terms, each functional module 210*a*-210*d* may be implemented in hardware or in software. Preferably, one or more or all functional modules 210*a*-210*d* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*-210*d* and to execute these instructions, thereby performing any steps of the measurement equipment 200 as disclosed herein.

Figure 11:
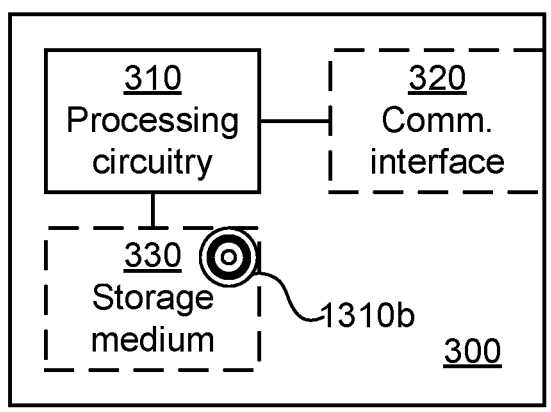
FIG. 11 is a schematic diagram showing functional units of a radio transmitter according to an embodiment.

FIG. 11 schematically illustrates, in terms of a number of functional units, the components of a radio transmitter 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1310*b* (as in FIG. 13), e.g. in the form of a storage medium 330. The processing circuitry 310 may further be provided as at least one application specific integrated circuit (ASIC), or field programmable gate array (FPGA).

Particularly, the processing circuitry 310 is configured to cause the radio transmitter 300 to perform a set of operations, or steps, as disclosed above. For example, the storage medium 330 may store the set of operations, and the processing circuitry 310 may be configured to retrieve the set of operations from the storage medium 330 to cause the radio transmitter 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The radio transmitter 300 may further comprise a communications interface 320 for communications with other entities, such as the measurement equipment 200 and the network node 400. As such the communications interface 320 may comprise one or more transmitters and receivers, comprising analogue and digital components.

The processing circuitry 310 controls the general operation of the radio transmitter 300 e.g. by sending data and control signals to the communications interface 320 and the storage medium 330, by receiving data and reports from the communications interface 320, and by retrieving data and instructions from the storage medium 330. Other components, as well as the related functionality, of the radio transmitter 300 are omitted in order not to obscure the concepts presented herein.

Figure 12:
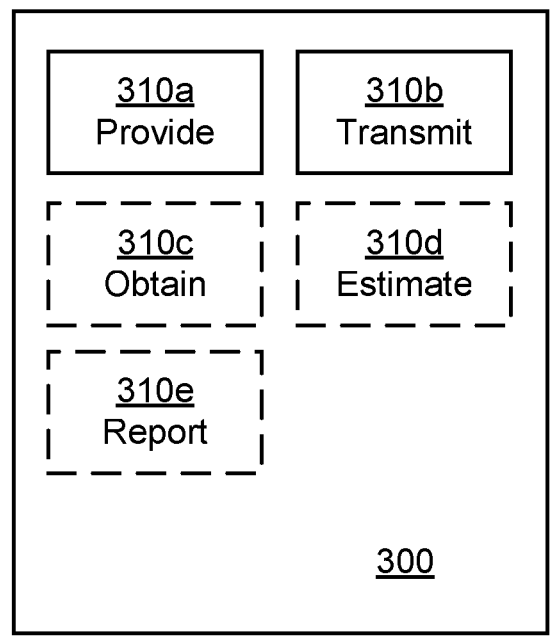
FIG. 12 is a schematic diagram showing functional modules of a radio transmitter according to an embodiment.

FIG. 12 schematically illustrates, in terms of a number of functional modules, the components of a radio transmitter 300 according to an embodiment. The radio transmitter 300 of FIG. 12 comprises a number of functional modules; a provide module 310*a* configured to perform step S202, and a transmit module 310*b* configured to perform step S204. The radio transmitter 300 of FIG. 12 may further comprise a number of optional functional modules, such as any of an obtain module 310*c* configured to perform step S206, an estimate module 310*d* configured to perform step S208, and a report module 310*e* configured to perform step S210. In general terms, each functional module 310*a*-310*e* may be implemented in hardware or in software. Preferably, one or more or all functional modules 310*a*-310*e* may be implemented by the processing circuitry 310, possibly in cooperation with the communications interface 320 and/or the storage medium 330. The processing circuitry 310 may thus be arranged to from the storage medium 330 fetch instructions as provided by a functional module 310*a*-310*e* and to execute these instructions, thereby performing any steps of the radio transmitter 300 as disclosed herein.

Figure 13:
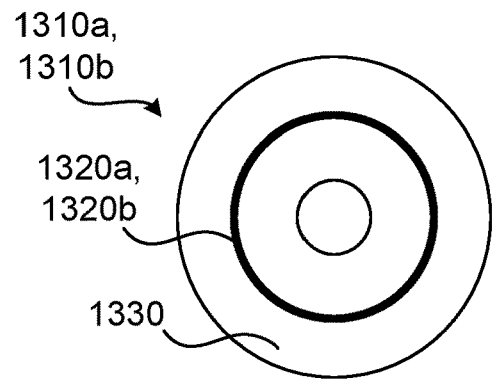
FIG. 13 shows one example of a computer program product comprising computer readable means according to an embodiment.

FIG. 13 shows one example of a computer program product 1310*a*, 1310*b* comprising computer readable means 1330. On this computer readable means 1330, a computer program 1320*a* can be stored, which computer program 1320*a* can cause the processing circuitry 210 and thereto operatively coupled entities and devices, such as the communications interface 220 and the storage medium 230, to execute methods according to embodiments described herein. The computer program 1320*a* and/or computer program product 1310*a* may thus provide means for performing any steps of the measurement equipment 200 as herein disclosed. On this computer readable means 1330, a computer program 1320*b* can be stored, which computer program 1320*b* can cause the processing circuitry 310 and thereto operatively coupled entities and devices, such as the communications interface 320 and the storage medium 330, to execute methods according to embodiments described herein. The computer program 1320*b* and/or computer program product 1310*b* may thus provide means for performing any steps of the radio transmitter 300 as herein disclosed.

In the example of FIG. 13, the computer program product 1310*a*, 1310*b* is illustrated as an optical disc, such as a CD (compact disc) or a DVD (digital versatile disc) or a Blu-Ray disc. The computer program product 1310*a*, 1310*b* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1320*a*, 1320*b* is here schematically shown as a track on the depicted optical disk, the computer program 1320*a*, 1320*b* can be stored in any way which is suitable for the computer program product 1310*a*, 1310*b*.

Figure 14:
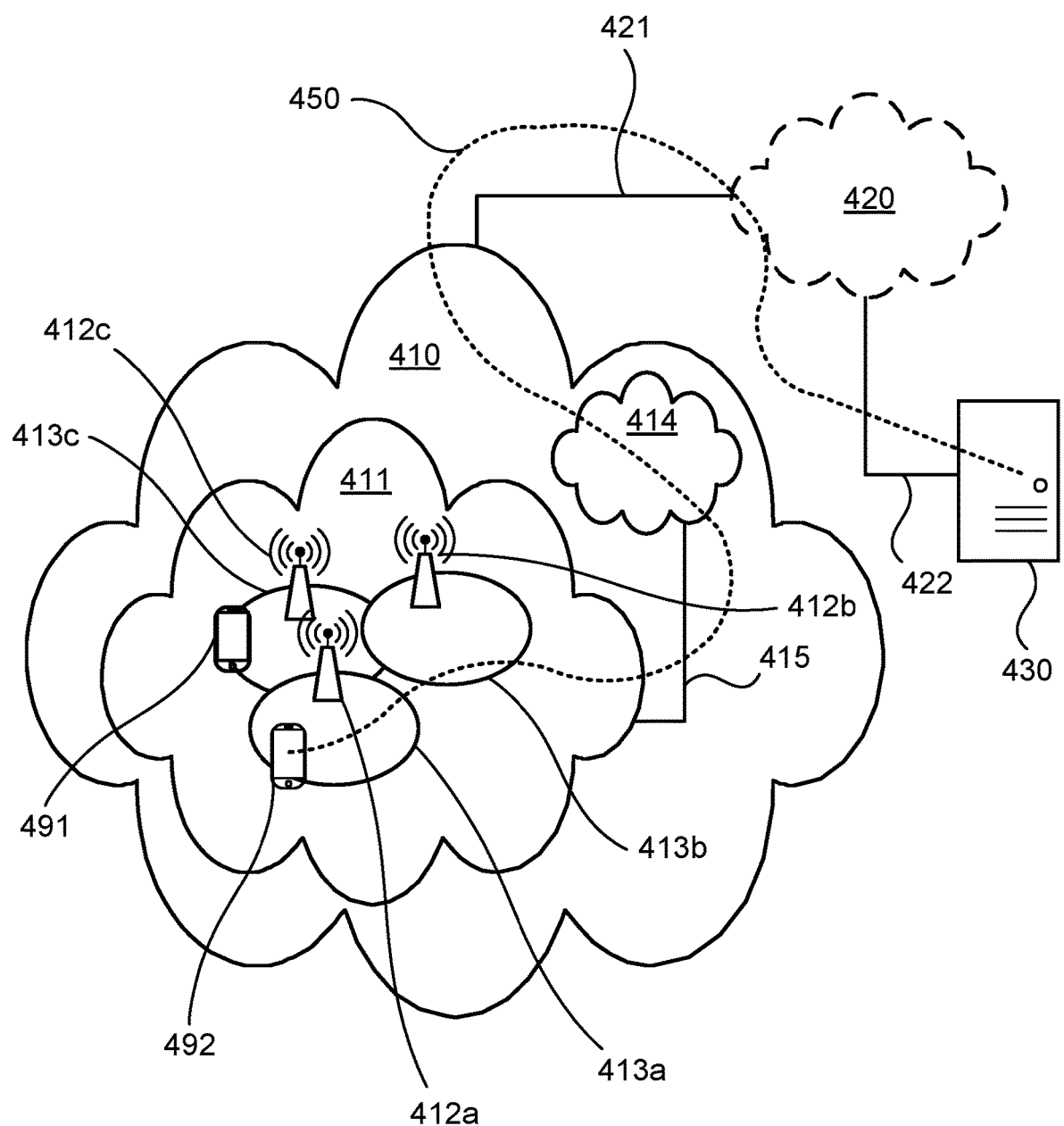
FIG. 14 is a schematic diagram illustrating a telecommunication network connected via an intermediate network to a host computer in accordance with some embodiments.

FIG. 14 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, and core network 414. Access network 411 comprises a plurality of radio access network nodes 412*a*, 412*b*, 412*c*, such as NBs, eNBs, gNBs (each corresponding to the aforementioned base stations and thus comprising the radio transmitter 300) or other types of wireless access points, each defining a corresponding coverage area, or cell, 413*a*, 413*b*, 413*c*. Each radio access network nodes 412*a*, 412*b*, 412*c* is connectable to core network 414 over a wired or wireless connection 415. A first UE 491 located in coverage area 413*c* is configured to wirelessly connect to, or be paged by, the corresponding network node 412*c*. A second UE 492 in coverage area 413*a* is wirelessly connectable to the corresponding network node 412*a*. While a plurality of UE 491, 492 are illustrated in this example, the disclosed embodiments are equally applicable to a situation where a sole UE is in the coverage area or where a sole terminal device is connecting to the corresponding network node 412. Each of the UEs 491, 492 might implement the functionality of the measurement equipment 200.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 14 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 15:
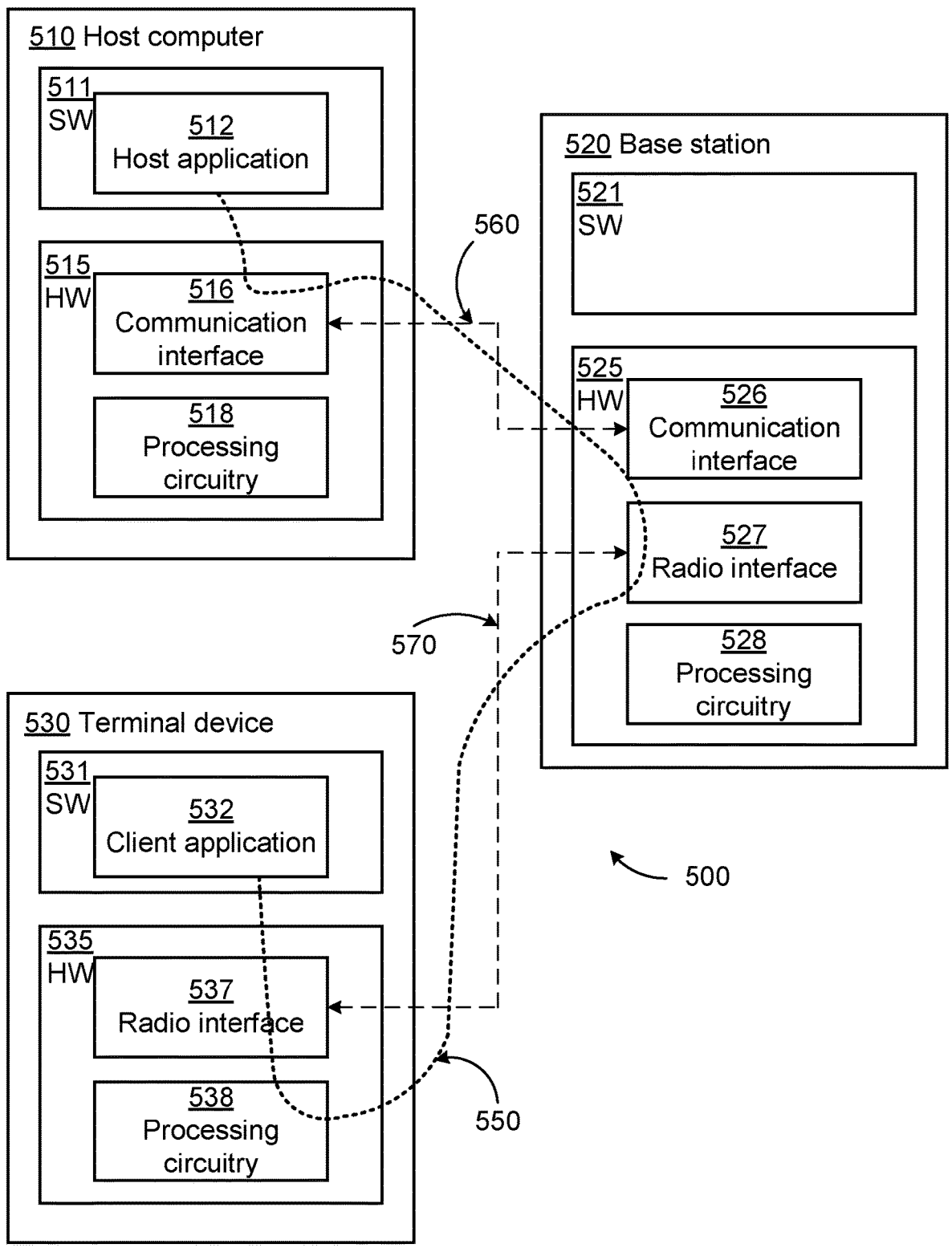
FIG. 15 is a schematic diagram illustrating host computer communicating via a radio base station with a terminal device over a partially wireless connection in accordance with some embodiments.

FIG. 15 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 15. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 might implement the functionality of the measurement equipment 200. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 might correspond to one of the aforementioned base stations and thus comprise the radio transmitter 300. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 15) served by radio access network node 520. Communication interface 526 may be configured to facilitate connection 560 to host computer 510. Connection 560 may be direct or it may pass through a core network (not shown in FIG. 15) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 15 may be similar or identical to host computer 430, one of network nodes 412a, 412b, 412c and one of UEs 491, 492 of FIG. 14, respectively. This is to say, the inner workings of these entities may be as shown in FIG. 15 and independently, the surrounding network topology may be that of FIG. 14.

In FIG. 15, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for over-the-air (OTA) estimation of a radio frequency (RF) parameter of a radio transmitter, the method being performed by a measurement equipment, the method comprising:
   obtaining information of spatial radiation pattern used by the radio transmitter and power allocation used by the radio transmitter for transmission of a signal using the spatial radiation pattern;
   obtaining a measurement of at least one of signal power and signal frequency of the signal as transmitted from the radio transmitter by measuring on the signal, the measurement being made with respect to spatial orientations and distance between the radio transmitter and the measurement equipment, wherein a near-field to far-field transformation is performed on a plurality of measurements to translate the near-field measurements to far-field measurements; and
   estimating the RF parameter for the signal transmitted by the radio transmitter from the measurement and using the information of spatial radiation pattern, power allocation, and spatial orientations and distance.

2. The method according to claim 1, wherein the spatial orientations and distance are defined by location of the radio transmitter, orientation of the radio transmitter relative the measurement equipment, location of the measurement equipment, and orientation of the measurement equipment relative the radio transmitter.

3. The method according to claim 1, wherein the measurement equipment has its own spatial radiation pattern, wherein the measurement is obtained by the measurement equipment performing measurements according to the spatial radiation pattern of the measurement equipment, and wherein the RF parameter for the signal transmitted by the radio transmitter is estimated based on the spatial radiation pattern of the measurement equipment.

4. The method according to claim 1, wherein the information of the spatial radiation pattern and power allocation used by the radio transmitter is obtained either from a network node or from the radio transmitter itself.

5. The method according to claim 1, wherein the signal is either a reference signal or a dedicated test signal.

6. The method according to claim 1, wherein at least two measurements of the signal are obtained and used when estimating the RF parameter, each measurement of which being made with respect to respective spatial orientations and distance between the radio transmitter and the measurement equipment.

7. The method according to claim 1, wherein the RF parameter pertains to either: total radiated power (TRP) as used by the radio transmitter when transmitting the signal; or
in-band carrier frequency error of the signal.

8. The method according to claim 1, wherein the RF parameter pertains to in-band carrier frequency error of the signal, wherein the measurement of the signal relates to frequency information of the signal, and wherein the in-band carrier frequency error is estimated by comparing the carrier frequency used by the radio transmitter to the frequency information of the signal.

9. The method according to claim 1, wherein either:
the measurement is made in far-field and defines a far-field measurement; or
the measurement is made in near-field and defines a near-field measurement, wherein the near-field measurement is given in terms of both phase and amplitude at a given surface in front of the radio transmitter.

10. The method according to claim 1, further comprising reporting the RF parameter to a network node of a network monitoring system.

11. The method according to claim 1, wherein the measurement equipment is a terminal device.

12. A method for over-the-air (OTA) estimation of a radio frequency (RF) parameter of a radio transmitter, the method being performed by the radio transmitter, the method comprising:
providing information of spatial radiation pattern used by the radio transmitter and power allocation used by the radio transmitter for transmission of a signal; and
transmitting the signal according to the spatial radiation pattern and using the power allocation for enabling OTA estimation of the RF parameter of the radio transmitter, wherein total radiated power of the radio transmitter is estimated by performing transformation of measurements of amplitude and phase per grid point from near-field to far-field.

13. The method according to claim 12, further comprising:
obtaining a measurement of the signal from a measurement equipment, the measurement having been made with respect to spatial orientations and distance between the radio transmitter and the measurement equipment; and
estimating a RF parameter for the signal from the measurement and using the information of spatial radiation pattern, power allocation, and the spatial orientations and distance.

14. The method according to claim 13, further comprising reporting the RF parameter to a network node of a network monitoring system.

15. The method according to claim 12, wherein the information is provided either to a network node or to a measurement equipment.

16. The method according to claim 12, wherein the radio transmitter is an active antenna system (AAS).

17. A measurement equipment for over-the-air (OTA) estimation of a radio frequency (RF) parameter of a radio transmitter, the measurement equipment comprising processing circuitry, the processing circuitry being configured to cause the measurement equipment to:
obtain information of spatial radiation pattern used by the radio transmitter and power allocation used by the radio transmitter for transmission of a signal using the spatial radiation pattern;
obtain a measurement of at least one of signal power and signal frequency of the signal as transmitted from the radio transmitter by measuring on the signal, the measurement being made with respect to spatial orientations and distance between the radio transmitter and the measurement equipment, wherein the measurement equipment is further caused to perform a near-field to far-field transformation on a plurality of measurements to translate the near-field measurements to far-field measurements; and
estimate the RF parameter for the signal transmitted by the radio transmitter from the measurement and using the information of spatial radiation pattern, power allocation, and spatial orientations and distance.

18. A radio transmitter for over-the-air (OTA) estimation of a radio frequency (RF) parameter of the radio transmitter, the radio transmitter comprising processing circuitry, the processing circuitry being configured to cause the radio transmitter to:
provide information of spatial radiation pattern used by the radio transmitter and power allocation used by the radio transmitter for transmission of a signal; and
transmit the signal according to the spatial radiation pattern and using the power allocation for enabling OTA estimation of the RF parameter of the radio transmitter, wherein total radiated power of the radio transmitter is estimated by performing transformation of measurements of amplitude and phase per grid point from near-field to far-field.

19. A non-transitory computer readable storage medium storing a computer program for over-the-air (OTA) estimation of a radio frequency (RF) parameter of a radio transmitter, the computer program comprising computer code which, when run on processing circuitry of a measurement equipment, causes the measurement equipment to:
obtain information of spatial radiation pattern used by the radio transmitter and power allocation used by the radio transmitter for transmission of a signal using the spatial radiation pattern;
obtain a measurement of at least one of signal power and signal frequency of the signal as transmitted from the radio transmitter by measuring on the signal, the measurement being made with respect to spatial orientations and distance between the radio transmitter and the measurement equipment, wherein the measurement equipment is further caused to perform a near-field to far-field transformation on a plurality of measurements to translate the near-field measurements to far-field measurements; and estimate the RF parameter for the signal transmitted by the radio transmitter from the measurement and using the information of spatial radiation pattern, power allocation, and spatial orientations and distance.

* * * * *